(No Model.) 2 Sheets—Sheet 1.
A. J. JONES.
PLANTER.
No. 335,525. Patented Feb. 2, 1886.
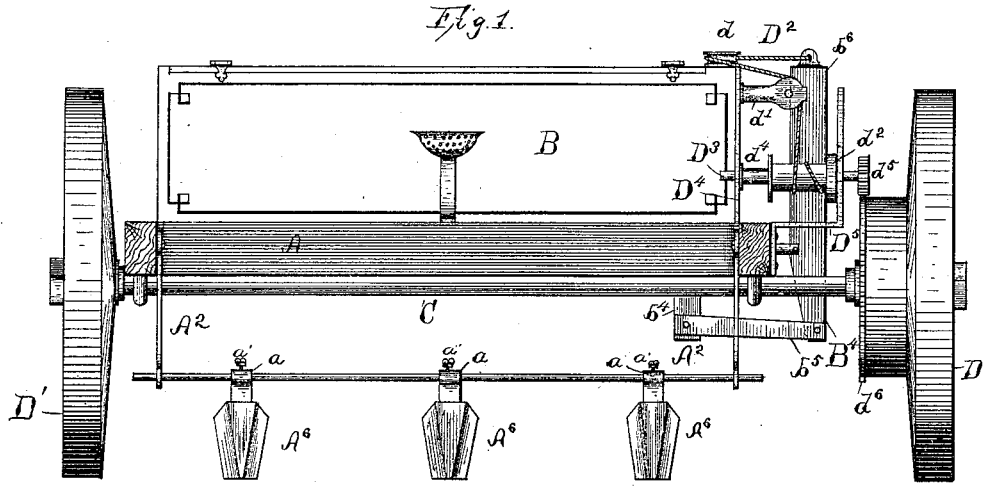
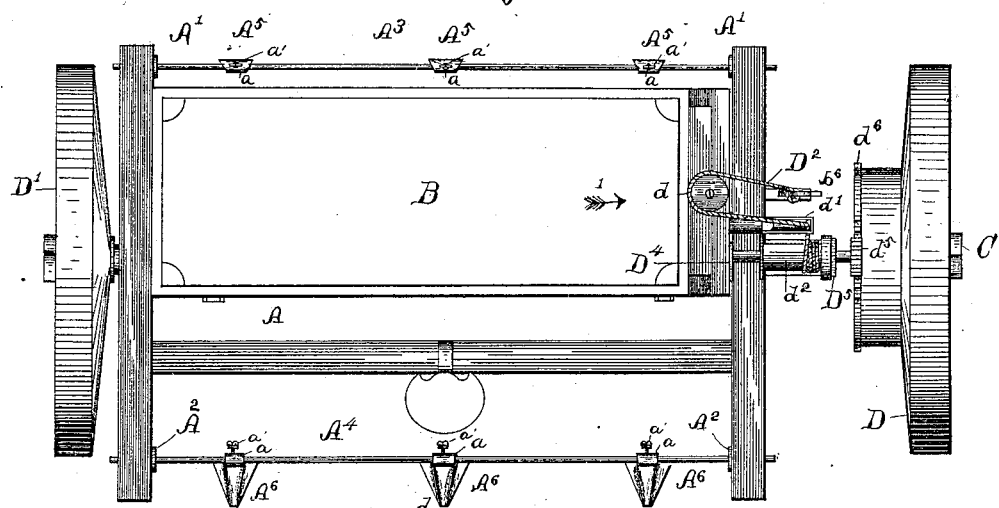
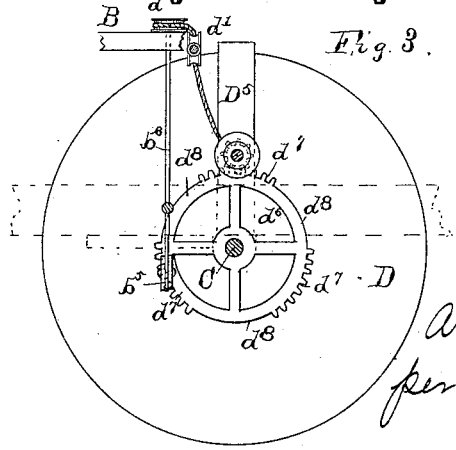

(No Model.) 2 Sheets—Sheet 2.
A. J. JONES.
PLANTER.
No. 335,525. Patented Feb. 2, 1886.
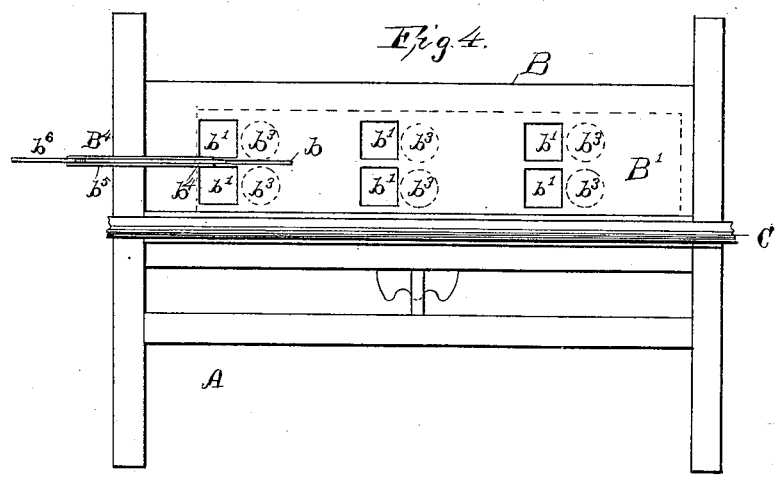
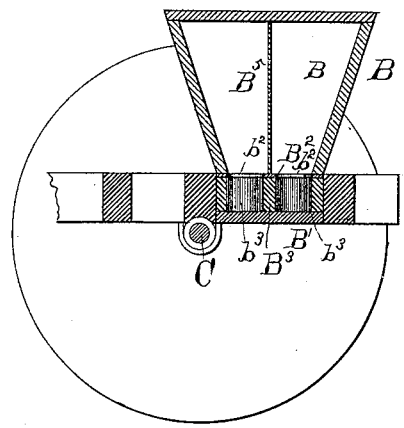
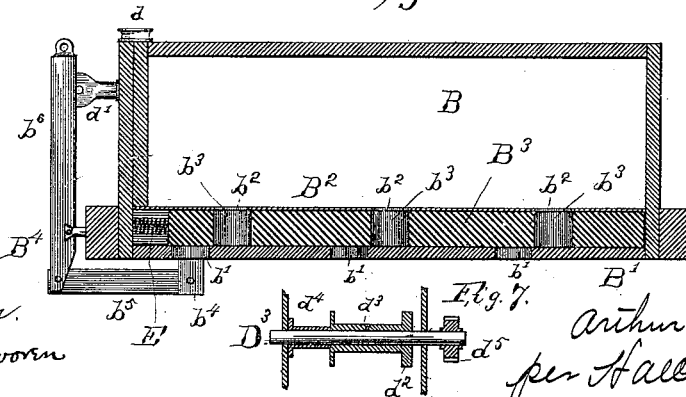

UNITED STATES PATENT OFFICE.

ARTHUR JOHN JONES, OF MIDDLEBURG, VIRGINIA.

PLANTER.

SPECIFICATION forming part of Letters Patent No. 335,525, dated February 2, 1886.

Application filed September 25, 1885. Serial No. 178,158. (No model.)

*To all whom it may concern:*

Be it known that I, ARTHUR J. JONES, a citizen of the United States, residing at Middleburg, in the county of Loudoun and State of Virginia, have invented certain new and useful Improvements in Planters; and I do hereby declare the following to be a full, clear, and exact description of the invention, such as will enable others skilled in the art to which it appertains to make and use the same.

My invention relates to that class of planters in which the seed-slide is operated by gearing connected with the supporting or drive wheel of the machine.

My invention consists of constructions and combinations, all as will hereinafter be described in the specification, and pointed out in the claims, reference being had to the accompanying drawings, in which—

Figure 1 represents an end elevation; Fig. 2, a top plan; Fig. 3, an elevation looking in the direction of arrow 1, Fig. 2, the seed-box and other interfering parts being removed; Fig. 4, a bottom plan showing the slide in dotted lines; Fig. 5, a transverse section; Fig. 6, a longitudinal section, and Fig. 7 a detail.

A represents the frame; B, the seed-box, mounted on the frame; C, the axle upon which the frame is mounted, and D D' drive-wheels on said shaft.

The frame A is provided with hangers A' and $A^2$, each having a bar marked, respectively, $A^3$ and $A^4$. The bar $A^3$ carries the furrow-openers $A^5$, and bar $A^4$ the closers $A^6$. These parts ($A^5$ and $A^6$) are provided with a sleeve, $a$, through which the bar passes, and a set-screw, $a'$, by which they are fixed in place. By means of the set-screws the parts $A^5$ and $A^6$ may be elevated when the machine is not planting, and thus be out of the way when the machine is moved or transported from field to field. They can also be moved longitudinally on the bar to adjust them to the grain-dropping openings in the seed-box.

The box B is mounted on the frame in any suitable manner, and is provided with a bottom, B', having openings $b'$ for the grain to pass through. Above this bottom is a second bottom, $B^2$, having openings $b^2$, which do not register with but are between the openings $b'$ and $b^2$. Between these bottoms is the reciprocating slide $B^3$, having openings $b^3$, which, when the slide is moved, alternately register with the openings $b'$ and $b^2$. This slide has a pendent arm, $b^4$, which projects through a slot, $b$, in the bottom B', and connects with the arm $b^5$ of an angle-lever, $B^4$, fulcrumed upon the frame A. The box, which is of a truncated V shape, may be divided into two parts by a longitudinal partition, $B^5$.

The arm $b^6$ of the angle-lever $B^4$ projects upwardly between the box and the wheel D. To the upper end of this arm is attached a cable, $D^2$, which passes around pulley $d$ on the top of the box, and pulley $d'$, projecting from the side of the box to a drum, $d^2$, to which it is attached. This drum may be fixed by a set-screw, $d^3$, to a shaft, $D^3$, journaled to brackets $D^4$ and $D^5$, respectively attached to the box and frame. The drum may be as long as the space between the two brackets; or a collar, $d^4$, may be placed between it and the bracket $D^4$, to prevent longitudinal movement when the shaft $D^3$ is adjusted. This shaft is provided at the outer end with a pinion, $d^5$, which meshes with a mutilated gear, $d^6$, on the drive-wheel D, and may be ungeared by unloosening the set-screw $d^3$ and sliding the shaft toward the box, so that when it is desired to move the machine without planting the pinion can readily be detached from its operating part. The gear $d^6$ on the drive-wheel may be divided into as many sections $d^7$ and $d^8$ as may be desired, so that the slide can be moved any desired number of times in each revolution of the wheel. The wheel shown has three blank spaces and three cogged spaces, so that the slide will be moved three times with each complete revolution of the wheel, being moved in one direction by the gearing, and in the reverse direction by spring E'.

When the parts of the machine are geared together, the operation is as follows: Power is applied to the gear by moving the machine, and the pinion $d^5$ will mesh with one of the cogged parts, $d^7$, of the mutilated gear and be revolved. This turns the shaft and drum and winds up the cable on the latter. As the cable is wound, it draws the upper end of the angle-lever toward the box, and the lower end draws the slide in the direction indicated by the arrow 1, and permits the openings in the latter to register with the openings in the bottom B', so that the seed will drop to the ground and be covered. By this time the pinion $d^5$ has reached part $d^3$ of the mutilated gear, which then ceases to act. The spring E, which may be located between the end of the slide and box, forces the slide back to its former position, and closes the openings in the bottom B', and brings its opening beneath the opening in the bottom B², so that a new charge of seed will be obtained by the slide.

What I claim as new is—

1. In a planter, the combination of a slide, an angle-lever having one end connected with the slide, the box having the pulleys, the drum and shaft having the pinion, a mutilated gear, and a cable connecting the upper end of the angle-lever and the drum, substantially as described.

2. In a planter, the combination of a box having a seed-slide, the spring, and the pulleys, an angle-lever connected by one end with a pendent arm of the seed-slide, a drum and shaft having a pinion, a mutilated gear, and a cable connecting the one arm of the lever with the drum, substantially as described.

In testimony whereof I affix my signature in presence of two witnesses.

ARTHUR JOHN JONES.

Witnesses:
 GEO. R. CARTER,
 W. B. NOLAND.